United States Patent [19]

Howard et al.

[11] Patent Number: 5,393,016
[45] Date of Patent: Feb. 28, 1995

[54] ENERGY ABSORPTION DEVICE FOR SHOCK LOADING

[75] Inventors: C. Douglas Howard, Edwardsport; Donald E. LaGrange, Washington; David A. Beatty, Worthington; David C. Littman, Bloomington, all of Ind.

[73] Assignee: The United States of America as represented by the Secretary of the Navy, Washington, D.C.

[21] Appl. No.: 83,602

[22] Filed: Jun. 30, 1993

[51] Int. Cl.⁶ ............................................. B64D 17/36
[52] U.S. Cl. ................................ 244/138 R; 188/371; 188/377; 244/147
[58] Field of Search .................. 244/142, 138 R, 147, 244/152; 188/371, 377

[56] References Cited

U.S. PATENT DOCUMENTS 2,474,124  6/1949  Shultz .................................. 188/371

FOREIGN PATENT DOCUMENTS 1276867  12/1986  U.S.S.R. ............................. 188/377

*Primary Examiner*—Galen L. Barefoot
*Attorney, Agent, or Firm*—Edward J. Connors, Jr.; William C. Townsend

[57] ABSTRACT

A shock energy absorbing device provides shock protection for the riser line employed to attach an aerodynamic deceleration device to a primary body during deployment of the system into an airstream. During deployment, for example, by dropping an unopened parachute and attached load or by rocket delivery of the unopened parachute and attached load, the parachute is made to open at a desired altitude whereupon very large shock tension forces are generated which are applied to the line. In order to protect the line from failing under these forces and to reduce the requirement for a bulky, heavy line, a shock absorber is provided in the form of a block having one or more breakable web portions formed therein and through which the riser line is threaded. Upon deployment of the system into an airstream, the shock tension forces operate to fracture some or all of the breakable web portions thereby dissipating the shock energy generated during deployment and protecting the riser line from failure.

1 Claim, 2 Drawing Sheets

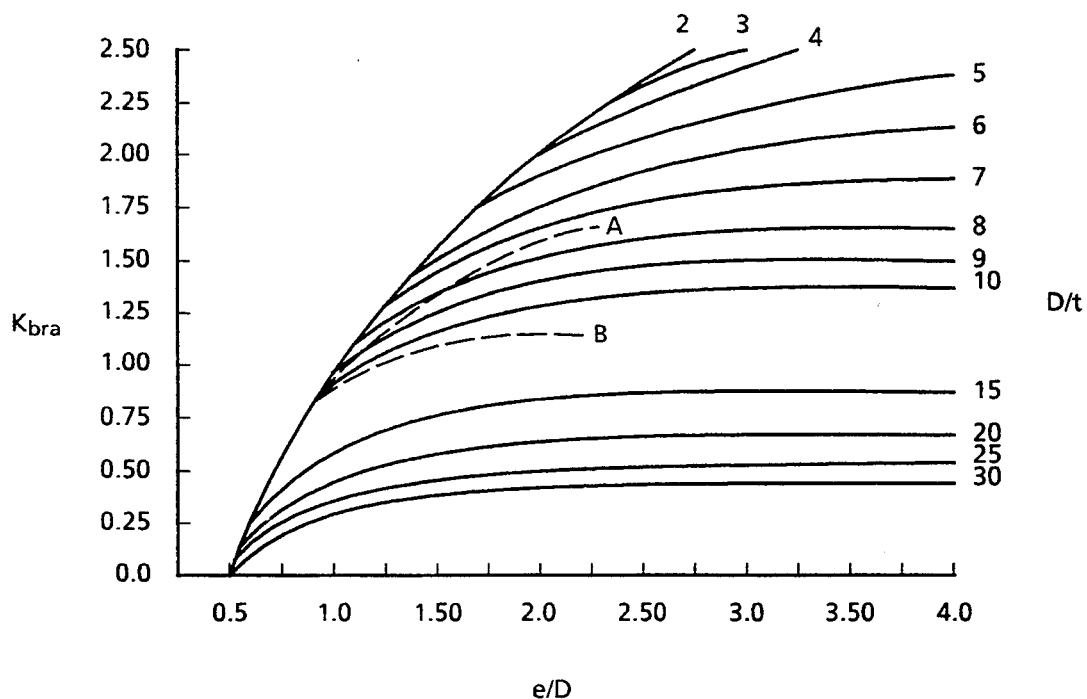
FIG. 4
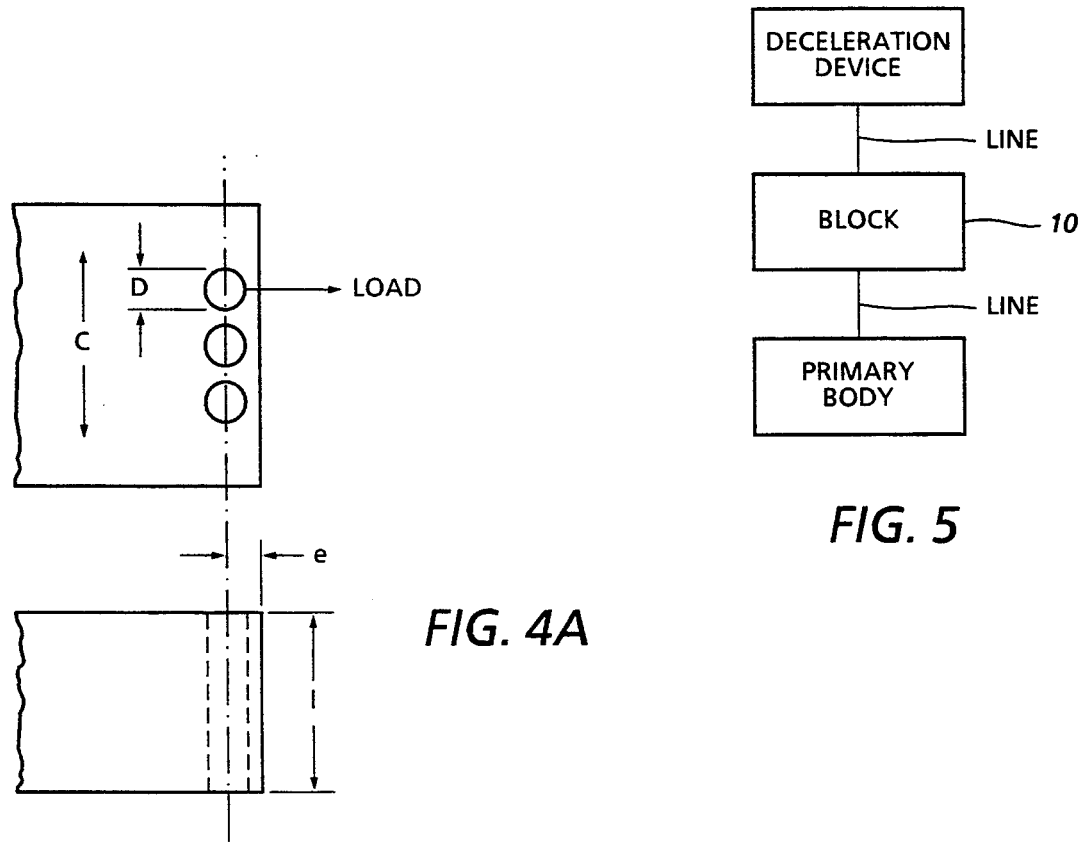
FIG. 4A
FIG. 5

ENERGY ABSORPTION DEVICE FOR SHOCK LOADING

DESCRIPTION OF THE INVENTION

This invention relates to energy absorbing devices, and more specifically, to a shock absorbing apparatus for use with an aerodynamic deceleration device such as a parachute which is connected by means of a riser line and harness to a suspended body such as a unit of ordnance.

When a body or load suspended from a parachute by a riser line is deployed into an airstream, for example, by dropping the unopened parachute and attached load from an aircraft, or by rocket delivery of the unopened parachute and attached load to a predetermined altitude where opening of the parachute is achieved, very great tension forces are exerted on the riser line attaching the load to the parachute due to the shock loading occurring when the parachute opens. Previously, a large, bulky, heavy riser line, typically made of nylon was required in such situations. For example, when deploying heavy, parachute suspended ordnance items, such as a rocket delivered illuminating warhead, a bulky, space consuming nylon cord has been employed.

To avoid having to use such a heavy and bulky riser line, it would be desirable to find a way to absorb the shock energy generated during deployment in order to be able to use a line whose capacity was limited to that required to maintain the load in a steady state, deployed condition plus a reasonable safety factor. Such a line would require much less bulk and weight, a very desirable feature in a system requiring delivery within a compact space by air (aircraft or rocket).

SUMMARY OF THE INVENTION

In accordance with the invention, a shock absorbing device is provided for use with an aerodynamic deceleration device which is connected by means of a riser line to a primary body. During deployment, the shock absorbing device absorbs shock energy generated during deployment of the system so that the riser line can be designed with a capacity limited to that required in a deployed, steady state condition plus a reasonable safety factor so that the riser line is compact and light weight. The shock absorber itself is compact and light weight to permit storage in a limited space during transport to the deployment site. The shock absorbing device includes a body having a fracturable portion through which the riser line is threaded. During deployment, the shock energy generated is absorbed as the work done breaking the fracturable portion of the riser line thus protecting the riser line and preventing its failure.

Accordingly, it is an object of this invention to provide a system in which the riser line connecting an aerodynamic deceleration device to a primary body has a designed capacity limited to supporting a steady state, deployed condition plus a reasonable safety factor.

It is a further object of this invention to provide a compact light weight riser line for use in connecting an aerodynamic deceleration device to a primary body.

It is a further object of this invention to provide a shock absorbing device for absorbing the shock energy generated when an aerodynamic deceleration device connected by a riser line to a primary body is deployed into an airstream.

It is a further object of this invention to provide such a shock energy absorbing device which is compact, light weight and capable of being stored in a limited space area during transport to deployment and yet which is stong enough to absorb the shock energy generated during deployment.

BRIEF DESCRIPTION OF THE DRAWINGS

FIG. 4 is a chart showing the shear-bearing efficiency factor.

FIG. 4a is a showing of the location of the non dimensional values of the various elements of the block FIG. 5 is a schematic representation of the block and its relation to the parachute and the load.

DETAILED DESCRIPTION OF THE PREFERRED EMBODIMENTS

Figure 1:
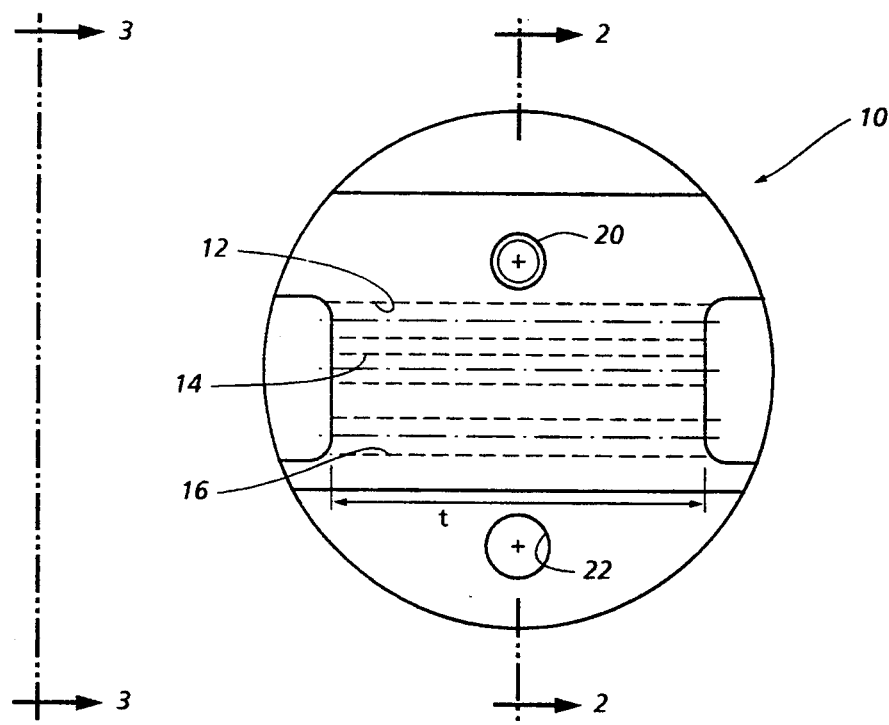
FIG. 1 is a plan of view of a shock absorbing device according to the invention.
Figure 2:
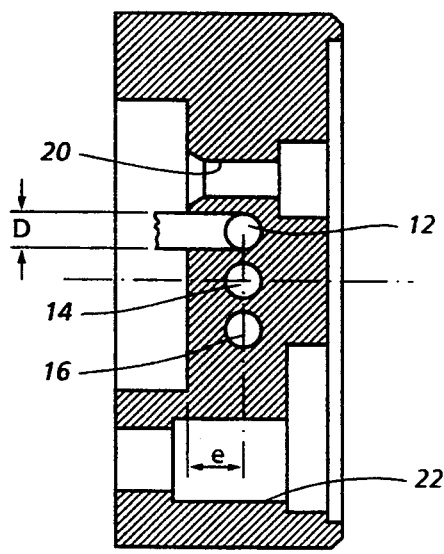
FIG. 2 is a sectional view along line 2—2 of FIG. 1.
Figure 3:
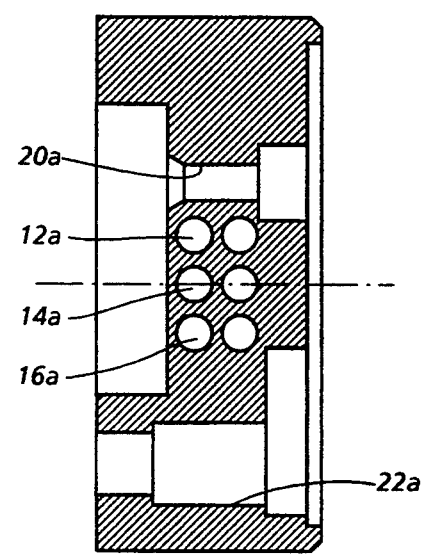
FIG. 3 is a view similar to that of FIG. 2, with portions broken away, of an alternate form of the invention.

P There is shown in FIGS. 1 and 2, a shock absorbing device according to this invention consisting of a block 10 made of a light weight, strong material such as an aluminum alloy. Block 10 has formed therein a plurality of holes 12, 14 and 16 which are parallel to one another and extend completely through the block 10. Extending through block 10 in a direction perpendicular to that of holes 12, 14 and 16 are additional holes 20 and 22. Holes 12, 14 and 16 each have a diameter D, and a distance e from the center of each hole to the surface of block 10. The holes 12, 14 and 16 are separated from surface of block 10 and from each other by a web of the block 10 material whose length is t(web thickness. An alternate version having additional holes and webs of material is shown in FIG. 3.

A riser line, not shown, is threaded through hole 20 and then through holes 12, 14 and 16 and finally through hole 22. Attached to one end of the riser line is a load, not shown, and to the other end is attached a deceleration device such as a parachute, not shown. Upon deployment, the shock force exerted on the riser line breaks some(preferably) or all of the webs of block material 10, thereby absorbing as much of the shock energy as is desired.

The theory governing the energy absorption by the shock absorbing device including the selection of the number and dimensions of the holes and the dimensions of the webs of material will be described by further reference to FIG. 4 and the following publications:

1. *Performance of and Design Criteria for Deplorable Aerodynamic Decelerators*. AD-429 971 of December 1963, Wright-Patterson Air Force Base, Ohio.
2. Bruhn, E. F. Analysis and Design of Flight Vehicle Structures. Carmel, Indiana: Jacobs Publishing, Inc., 1973.

Trailing aerodynamic deceleration devices, such as canopies, assume a relative velocity with respect to the primary body in the process of drifting aft of that body into their final position. Upon drifting aft a distance equal to length of the unstretched suspension-lines ($L_S$), the-differential velocity between the primary and secondary bodies is at its maximum. After reaching $L_S$, the lines are stretched ($L_{MAX}$), the secondary body is accelerated to the mutual speed of the primary and secondary bodies, and the differential velocity becomes zero. The inertia force, a result of this acceleration, is called snatch force. The energy transmitted to the primary body upon full line-extension derived from Reference 1 is:

$$E = \tfrac{1}{2} M_c V^2_{II,2(rel)} \quad (1)$$

Where:
$M_c$ = Mass of canopy cloth area and suspension lines across the cloth area.
$V_{II,2(rel)}$ = Velocity of secondary body relative to that of the primary body at time $t_2$ (line-extension).

The velocity of the secondary body relative to that of the primary body at line-extension can be determined by:

$$V_{II,2(rel)} = V_{I,2} - V_{II,2} \quad (2)$$

$$V_{I,2} = v_o(J_b v_o t_2 + 1) \quad (3)$$

$$V_{II,2} = v_o(J_c v_o t_2 + 1) \quad (4)$$

Where:
$v_o$ = Total velocity at deployment.

$$J_b = p\,(C_D S_b) \div 2\, M_b \quad (5)$$

$$J_c = p\,(C_D S_b) 2\, M_c \quad (6)$$

Where:
p = Air density.
$C_D S_b$ = Drag area of suspended load.
$C_D S_c$ = Drag area of uninflated parachute.
$M_b$ = Mass of suspended load.
$t_2$ = Time required for suspension lines to extend.

The time $t_2$ is determined by trial and error from the relation:

$$L_S = \frac{1}{J_b} \ln(1 + J_b v_o t_2) - \frac{1}{J_c} \ln(1 + J_c v_o t_2) \quad (7)$$

The "Energy Absorption Device For Shock Loading" absorbs the energy created by the snatch loading by utilizing the shear outbearing strength of the shock block material modified due to impact loading. From Reference 2, the equation for shear-out bearing strength is:

$$P_{bru} = K_{bru} F_{tu} A_{br} \quad (8)$$

Where: $K_{bru}$ = Shear out-bearing efficiency factor.
$F_{tu}$ = Ultimate tensile strength of the material.
$A_{br}$ = Bearing area = (Cable diameter) × (Web thickness).

The value of $K_{bru}$ is given by the curves in FIG. 1.
Where: D = Diameter of the hole.
e = Distance from center of hole to edge.
t = Web thickness.

In the case of a suddenly applied load (impact loading), the stress in the material is twice that of a gradually applied load. Therefore the effective shear out-bearing strength of the material under impact loading is:

$$P_{ebru} = \tfrac{1}{2} P_{bru} \quad (9)$$

The work done on the shock block, consequently energy absorbed, is:

$$E = P_{ebru}{}^{(N\,t)} \quad (10)$$

Where: N = Number of webs.

EXAMPLE:

| | | | |
|---|---|---|---|
| $M_c$ | = 0.0915 lb | $F_{tu}$ | = 45000 lb/in² |
| $M_b$ | = 9.422 lb | D | = 0.125 in |
| $v_o$ | = 2239.0 ft/s | e | = 0.118 in |
| p | = $2.208^{-3}$ lb₂s²/ft⁴ | t | = 1.912 in |
| $C_D S_c$ | = 0.1 ft² | $A_{br}$ | = 0.239 in² |
| $C_D S_b$ | = 0.05 ft² | N | = 3.5 |
| $L_S$ | = 5.0 ft | | |

$$J_b = p\,(C_D S_b)\,2\,M_b = 1.901^{-4} \quad (5)$$

$$J_c = p\,(C_D S_c)\,2\,M_c = 3.885^{-2} \quad (6)$$

$$L_S = \frac{1}{J_b} \ln(1 + J_b v_o t_2) - \frac{1}{J_c} \ln(1 + J_c v_o t_2) \quad (7)$$

Substituting into Equation (7) and solving for $t_2$ results in:
$t_2 = 0.0088$ seconds.

$$V_{I,2} = v_o(J_b v_o t_2 + 1) = 2230.6\ ft/s \quad (3)$$

$$V_{II,2} = v_o(J_c v_o t_2 + 1) = 1268.2\ ft/s \quad (4)$$

$$V_{II\,2(rel)} = V_{I,2} - V_{II,2} = 962.4\ ft/s \quad (2)$$

Therefore the energy transmitted to the primary body upon full line-extension is:

$$E = \tfrac{1}{2} M_c V^2_{II,2(rel)} = 1317.0\ ft \cdot lb \quad (1)$$

From FIG. 1: $K_{bru} = 0.44$ $$P_{ebru} = \tfrac{1}{2} K_{bru} F_{tu} A_{br} = 2366.1\ lb \quad (8)$$

Therefore the energy absorbed by the shock block is:

$$E = P_{ebru}\,(N\,t) = 1319.5\ ft \cdot l \quad (10)$$

As can be seen, by an iterative process of solving for different variables, the desired dimensions of the holes and webs of material can be derived.

We claim:
1. An energy absorbing device for use in the deployment into an airstream of an aerodynamic deceleration device attached to a primary body by at least one line connected at its ends to the deceleration device and to the primary body comprising a block mounted intermediate the ends of the line, the block having a plurality of holes passing therethrough, the block portions between the holes and between some of the holes and the surface of the block forming webs of material which are fracturable, the length and thickness of the webs being proportional to the weight of the load, the line being threaded through the holes so that application of shock tension force to the line during deployment of the body into the airstream causes fracture of at least some of the webs to provide absorption of at least a portion of the shock energy generated when the shock tension force is applied during deployment.

* * * * *